United States Patent [19]
Thomas et al.

[11] Patent Number: 4,563,362
[45] Date of Patent: Jan. 7, 1986

[54] MEAT ANALOG HAVING A PROTEIN-GUM-STARCH MATRIX

[75] Inventors: Michael E. Thomas, Jackson, N.J.; Rita W. Brander, New Rochelle, N.Y.; Teresa A. Raap, Ridgefield, Conn.; Marshall M. Rankowitz, Englishtown, N.J.

[73] Assignee: General Foods Corporation, White Plains, N.Y.

[21] Appl. No.: 593,213

[22] Filed: Mar. 26, 1984

[51] Int. Cl.[4] .............................................. A23L 1/04
[52] U.S. Cl. .................................... 426/104; 426/574; 426/578; 426/802
[58] Field of Search .............. 426/104, 574, 578, 802, 426/646

[56] References Cited

U.S. PATENT DOCUMENTS

| | | | |
|---|---|---|---|
| 3,519,434 | 7/1970 | Schuppner | 426/574 |
| 3,711,291 | 1/1973 | Leidy et al. | 426/574 |
| 3,836,678 | 9/1974 | Leidy et al. | 426/104 X |
| 3,919,435 | 11/1975 | Feldbrugge et al. | 426/802 X |

OTHER PUBLICATIONS

Whistler, R. L. et al., Industrial Gums, Academic Press, N.Y., 1973, pp. 570–573.

Primary Examiner—Robert Yoncoskie
Attorney, Agent, or Firm—Thomas A. Marcoux; Joseph T. Harcarik; Daniel J. Donovan

[57] ABSTRACT

A meat analog is provided having a protein-gum-starch matrix providing desirable textural properties approaching all-meat products.

11 Claims, No Drawings

MEAT ANALOG HAVING A PROTEIN-GUM-STARCH MATRIX

FIELD OF THE INVENTION

The present invention relates to a meat analog having textural attributes closely resembling all-meat products. More particularly, this invention is directed to a meat analog having a protein-gum-starch matrix providing desirable textural properties.

BACKGROUND OF THE INVENTION

In recent years, a great deal of effort has been made in the field of protein technology in producing meat substitutes. Extensive development has occurred and is continuing in providing meat analogs based on different formulations.

Feldbrugge, et al., U.S. Pat. No. 3,919,435, patented Nov. 22, 1975, describes a meat analog system which uses a mixture of an encapsulated combination of polymeric carbohydrate gel precursor with an animal fat or vegetable oil and a protein gel precursor containing a mixture of vegetable proteinaceous material and non-vegetable proteinaceous material such as albumen, casein, whey and mixtures thereof.

Leidy, et al., U.S. Pat. No. 3,711,291, patented Jan. 16, 1973, describes a meat analog containing a blend of a combination of non-fibrous vegetable protein and non-vegetable protein of albumen, casein, whey and mixtures thereof with non-rendered animal fat and filler material of specific interest in the production of a juicy sausage analog. Another Leidy, et al. U.S. Pat. No. 3,713,837, patented Jan. 30, 1973, describes a process for making a similar meat analog as produced in U.S. Pat. No. 3,711,291 described above, but also requiring freezing and thawing the product to provide a juicy sausage analog. An additional Leidy, et al. U.S. Pat. No. 3,836,678, patented Sept. 17, 1974, describes a sausage-like food product prepared by autoclaving a gel precursor which is a mixture of a non-fibrous gelable soy protein isolate and material selected from albumen, casein, whey and mixtures thereof.

A fourth Leidy, et al. U.S. Pat. No. 3,719,498 suggests a sausage analog process similar to that described in the other three Leidy, et al. patented described above. This patent describes a meat analog formed from a protein gel precursor that has incorporated therein frozen non-rendered animal fatty tissue prior to a heating operation which causes gelation of the vegetable protein.

Tewey, et al., U.S. Pat. No. 3,922,352, patented Nov. 25, 1975, describes a process to produce a juicy sausage analog having three distinct phases: a continuous gel phase; a substantially discontinuous fat phase; and a discontinuous chewy proteinaceous phase. In this process, solidified fat particles, particles of a chewy proteinaceous component and a precursor of the continuous gel phase are mixed and coarsely chopped to obtain a substantially uniform heterogeneous distribution of the particulate material within the continuous gel phase precursor. The resulting coarsely chopped blend is formed into a substantially cohesive sausage analog by coagulating the continuous gel phase precursor.

All of the above described patents provide a satisfactory meat and sausage analog. The present invention provides another highly desirable meat and sausage analog product by making the product in a manner substantially different than that employed by such other patents.

SUMMARY OF THE INVENTION

The present invention is directed to the formation of meat substitute products by using a combination of water, an edible heat coaguable proteinaceous material, specific hydrocolloids such as xanthan gum or locust bean gum, a specific type of starch, i.e., a finely divided, unmodified waxy maize starch of branched chain amylopectin polymers and a fat, which is liquid or semi-liquid, especially at room temperature. The mixture of the specific ingredients described above in combination with the appropriate flavors, coloring materials and the like, completes and balances the desired meat analog. In the combination of the protein-gum-starch mixture, a meat analog is produced which has the textural properties of tenderness, cohesiveness and chewiness approaching those of all-meat sausage or frankfurters.

DETAILED DESCRIPTION OF THE INVENTION

The meat analogs made by the present invention resemble and duplicate, in essential physical and taste characteristics, a wide variety of meat products. The present meat analogs may resemble specific natural animal meat cuts such as bacon, steak, pork chops, etc., as well as natural meat systems that have been reprocessed and reformulated with other components as in a sausage product.

As employed herein, the term "a meat analog" is used as in its normal definition in that the formed analog product resembles a meat product, yet is entirely distinct therefrom in its source materials. In this invention, the vegetable proteinaceous material and non-vegetable proteinaceous materials such as albumen, casein, lactalbumin, whey and combinations thereof are formulted to resemble the natural meat source in essential characteristics.

An analog resembling natural meat cuts may be a system with a substantial amount of fibers bound together in a matrix. The fibers may be derived from vegetable proteinaceous materials and aid in adding chewy qualities to the final product.

In contrast, a sausage analog is not considered to resemble natural meat cuts. A sausage analog is formulted and processed so as to duplicate as closely as possible meat products that are initially formed into an aqueous emulsion system. The meat emulsion is then heated which results in gelation, thus introducing a degree of rigidity to the product. The initial natural meat emulsion with its water component has flow characteristics so that it may be readily shaped, as in a casing, prior to gelation to a stable physical form. Examples of such sausages are bologna, olive loaf, frankfurters and beef jerky.

The meat analog composition of the present invention includes a heat coaguable proteinaceous material. The protein must be an edible protein material since it is to be incorporated in meat analog products which are designed for ingestion by humans. The usual source of such protein is vegetable matter, however, a non-vegetable protein, preferably egg albumen, but also including casein, lactalbumin, whey and combinations thereof, may also be employed alone or in combination with one another. Examples of suitable vegetable protein sources are soybeans, safflower seed, corn, peanuts, wheat, peas, sunflower seed, cottonseed, coconut, rapeseed, sesame seed, leaf proteins and the like. Single cell proteins such as yeast may also be used. Generally, if the protein source is a vegetable protein, the protein, prior to use, is placed in a relatively pure form by procedures well known in the art. The amount of protein in the finished meat analog products can range from about 10 to about 25 weight percent, preferably from about 13 to about 14 weight percent. In this invention a soy isolate is the preferred vegetable protein.

A highly desirable feature of the compositions of this invention is the fact that up to about 30 weight percent of the edible heat coaguable protein can be replaced by an edible non-heat coaguable protein and not effect the desired properties of the meat analog. Suitable edible non-heat coaguable protein include soy, gelatin, collagen, lactalbumin, caseins and whey.

To impart a desired viscosity and body to the composition, a hydrocolloid which is either xanthan gum or locust bean gum is added to the protein blend at levels within the range of about 0.05 to 3 weight percent of the composition. The desired viscosity, which is important in achieving in the consumer, the perception of an oily texture and mouthfeel is within the range of 30,000 to 1,000,000 centipose (measured at 40° F. 4° C.). It has been found that hydrocolloids, other than xanthan gum or locust bean gum, do not provide the satisfactory results desired.

The only starch used in the composition of this invention is a particulate unmodified waxy maize starch of branched chain amylopectin polymer. A commercial product of this type is Amioca $^R$ Starch, sold by Amaizo Company. The high amylopectin level in this starch sets it aside from regular starches and gives it certain characteristics which make it particularly suitable as a stabilizer and thickening agent. The particle size of the starch granules permits to be used in the compositions of the present invention is preferably such as to permit about 95±5 percent of the granules to pass through a 200 U.S. mesh screen.

The amount of starch in the finished product can range from about 3 to about 30 weight percent, and preferably about 5 to 15 weight percent.

In order to make the most palatable meat analogs according to the present invention, it is preferred that the protein mix used therein contain up to about 45 weight percent of an oil and/or fat, and preferably from about 5 to about 30%. Fats utilized in forming the protein mix suitable for such use include liquid or semi-liquid glyceride shortening derived from animal, vegetable or marine fats and oils including synthetically prepared shortening. These glycerides can contain saturated or unsaturated "long chain" acyl radicals having from about 12 to about 22 carbon atoms such as lauroyl, lauroleoyl, myristoyl, myristoleoyl, palmitoyl, palmitoleoyl, stearoyl, oleoyl, linoleoyl, linolenoyl, arachidoyl, arachidonyl, behenoyl, erucopyl, and the like, and are generally obtained from edible fats and oils such as cottonseed oil, soybean oil, coconut oil, rapeseed oil, peanut oil, olive oil, palm oil, palm kernel oil, sunflower seed oil, rice bran oil, corn oil, sesame seed oil, safflower oil, herring oil, menhaden oil, pilchard oil, lard, tallow and the like. These glycerides can also contain, in part, one or two short chain acyl groups having from 2 to about 6 carbon atoms such as acetyl, propanoyl, butanoyl, valeryl, and caproyl. These glycerides can be prepared by random or low temperature interesterification reactions of fatty triglyceride-containing oils and fats, such as interesterified or rearranged cottonseed and lard; and they can be otherwise formed by various organic syntheses.

A necessary component of the compositions of this invention is water. The water content of the final product will be determined by the type of meat product that is to be duplicated by the analog system. For example, in the sausage analog, a dry, intermediate or wet sausage may be duplicated. In this latter class of products, water contents of 42 to 74 percent have been found acceptable, with an optimum range of 45 to 55 weight percent. However, these percentage figures are not to be considered limiting, since different types of sausage analogs may by produced with other levels of water content.

Most of any flavoring material commonly employed in meat or to provide a meat like flavoring, can be employed in the compositions of this invention. Prominent among these materials are hydrolyzed vegetable protein, artificial and natural meat flavoring, black pepper, white pepper, coriander, mace, nutmeg, rosemary, sugars, red pepper, sage, salt, monosodium glutamate, sodium caseinate, sodium guanylate and the like. The amounts used depend on the type of flavorings desired, and range from about 0.005 to about 3% for each flavor, based on the weight % of the entire composition.

If a sausage analog is to be produced the ingredients are mixed in a standard mixer. The mixed material can be passed through a meat grinder fitted with a die, preferably ⅜", to obtain a substantially uniform heterogeneous distribution of the other particulte materials within the proteinaceous matrix. The resulting coarsely constructed blend is then stuffed in edible collagen sausage casings, of about 15 to 20 mm in diameter, and tied into standard size links. The links can then be heated to coagulate the ingredients and thus form substantially cohesive sausage analogs.

It has been found that the emulsions of the present invention may also be used with natural meats as meat extenders.

To further illustrate the essential aspects of this invention the following example is provided.

EXAMPLE

To form a Vienna sausage 100% analog, the ingredients and amounts thereof designated in Table I below were employed as follows:
(1) The following ingredients were dry blended:
   Amioca starch (a finely divided unmodified waxy maize starch of branched chain amylopectin polymers), egg albumen, soy isolate, salt, sugar, hydrolyzed vegetable protein (HVP), frankfurter flavor, monosodium glutamate, garlic powder, mustard powder, paprika and ginger.
(2) The fat flavor was then cut into the dry blend (1) like shortening.
(3) The xanthan gum was dispersed in 40% of the water (temp=100° F.) and the resulting gum dispersion was cooled to 60° F.
(4) The remaining water, 60%, and colors (monascus red and grape skin extract) heated at 60° F. were added to the dry blend (1) and (2) and mixed. The xanthan gum dispersion (3) was then added and the resulting mixture was admixed for one additional minute.
(5) The cottonseed oil and smoke flavor were then added to mix (4). The oils were then first folded in and the resulting system was then emulsified under high shear.

| Typical Specifications for the Resulting Emulsion | |
| --- | --- |
| Viscosity | 20-25 B.U. |
| Density | 0.80-0.85 g/cc |
| Temperature | 72-78° F. |
| Emulsion drop size | 5-25 microns |

The viscosity is measured under the following conditions: Brookfield H.A.T. 5 r.p.m., T-B Bar 36.6 mm, factor 160 m=cps.

(6) The system was then partially deaerated.

| Typical Specification for Deaerated Emulsion of the Continuous Phase | |
| --- | --- |
| Viscosity | 17-24 B.U. |
| Density | 0.90-0.95 g/cc |
| Temperature | 70-75° F. |

(7) Stuff (6) into 17 mm collagen casings; to produce links which were each approximately 3⅝" in length, and weighed 21 grams per link.

(8) The links were then heat set as follows:
8 min. @ 150° F./20% relative humidity 10 min. @ 160° F./steam
10 min. @ 170° F./steam
10 min. @ 180° F./steam (9) Quench by cold showering or in a tempering room.
(10) The products are then packaged and frozen.

The Vienna sausage 100% analog produced above was formed from the following ingredients and amounts:

TABLE I

| Vienna Sausage Analog | |
| --- | --- |
| Ingredients | % By Weight |
| Water | 49.6572 |
| Cottonseed Oil | 17.3400 |
| Amioca Starch | 10.5600 |
| Egg Albumen | 8.5100 |
| Soy Isolate | 5.0250 |
| Salt | 2.0720 |
| Light Brown Sugar | 1.9200 |
| Liquid Smoke Flavor | 1.8300 |
| Fat Flavor | 1.1300 |
| HVP | 0.6650 |
| Xanthan Gum | 0.4960 |
| Frankfurter Flavor | 0.3600 |
| Monascus Red | 0.2450 |
| Monosodium Glutamate | 0.1240 |
| Garlic Powder | 0.0150 |
| Mustard Powder | 0.0150 |
| Paprika | 0.0080 |
| Ginger | 0.0080 |
| Grape Skin Extract | 0.0198 |

The resulting sausage analog product has excellent organoleptic qualities. The product has textural properties of tenderness, cohesiveness, and chewiness approaching all-meat Vienna sausage.

The sausage analog compositions of this invention are formed from preferred compositions as follows:

| Ingredients | Weight % |
| --- | --- |
| Starch | about 10 to about 11 |
| Protein | about 13 to about 14 |
| Gum | about 0.4 to about 0.6 |
| Oil | about 15 to about 19 |
| Water | about 45 to about 55 |
| Salt | about 1 to about 3 |
| Sugar | about 1 to about 3 |
| Remainder is other flavoring ingredients. | |

Many variations and modifications of the present invention will be apparent to those skilled in the art upon reading the above disclosure. It is intended that all such modifications and variations be included within the scope of the invention.

What is claimed is:

1. A meat analog formed from a composition comprising water, protein in an amount of from about 10 to about 25 weight percent of the composition, said protein including an edible coaguble proteinaceouss material, a hydrocolloid in an amount of from about 0.05 to about 3 weight percent of the composition selected from the group consisting of xanthan gum and locust bean gum, and mixtures thereof, a particulate unmodified waxy maize starch of branched chain amylopectin polymers in an amount of from about 3 to about 30 weight percent of the composition and a liquid or semi-liquid fat or oil in an amount of up to about 45 weight percent of the composition.

2. The product of claim 1 wherein the hydrocolloid is xanthan gum.

3. The product of claim 1 wherein the hydrocolloid is locust bean gum.

4. The product of claim 1 wherein the edible heat coaguable proteinaceous material comprises egg albumen and a vegetable protein.

5. The product of claim 4 wherein the fat is a vegetable oil.

6. The product of claim 5 wherein the vegetable protein is soy isolate.

7. The product of claim 6 wherein the oil is cottonseed oil.

8. The product of claim 7 wherein the meat analog contains salt, sugar and other flavoring materials.

9. The product of claim 8 wherein the meat analog is stuffed into an edible sausage casing and heated to coagulte the composition to form a sausage analog.

10. The product of claim 9 comprising, in weight percent, about 10 about 11% starch, about 13 to about 14% protein, about 0.4 to about 0.6% gum; about 15 to about 19% oil; about 45 to about 55% water; about 1 to about 3% salt; about 1 to about 3% sugar, with the remainder being other flavoring materials.

11. The product of claim 9 wherein up to about 30 weight percent of said edible heat coaguable protein is replaced by non-heat coaguable protein.

* * * * *